United States Patent [19]

Richards et al.

[11] 4,444,816
[45] Apr. 24, 1984

[54] RADIATION CROSS-LINKING OF POLYAMIDES

[75] Inventors: James A. Richards, Cupertino; Ronald L. Dieck, Sunnyvale, both of Calif.

[73] Assignee: Raychem Corporation, Menlo Park, Calif.

[21] Appl. No.: 324,222

[22] Filed: Nov. 23, 1981

Related U.S. Application Data

[63] Continuation-in-part of Ser. No. 212,483, Dec. 3, 1980, abandoned.

[51] Int. Cl.³ .................. C08F 8/00; C08F 283/04; C08G 18/00; C08L 77/00
[52] U.S. Cl. .................. 428/36; 174/DIG. 8; 204/159.15; 204/159.19; 525/421
[58] Field of Search .................. 204/159.15, 159.19; 525/421; 174/DIG. 8; 428/36

[56] References Cited

U.S. PATENT DOCUMENTS

| | | | |
|---|---|---|---|
| 2,858,259 | 10/1958 | Lawton et al. | 204/159.15 |
| 2,965,553 | 12/1960 | Dixon et al. | |
| 3,243,211 | 3/1966 | Wetmore | 174/DIG. 8 |
| 3,539,411 | 11/1970 | Heslop et al. | 174/DIG. 8 |
| 3,681,216 | 8/1972 | Galiano et al. | 204/159.15 |
| 3,711,389 | 1/1973 | Hook et al. | |
| 3,847,721 | 11/1974 | Evans | 204/159.19 |
| 3,911,192 | 10/1975 | Anonoff et al. | 525/276 |
| 3,970,770 | 7/1976 | Dhami | 525/306 |
| 3,985,716 | 10/1976 | Dhami | 525/331 |
| 4,073,830 | 2/1978 | Nyberg | 204/159.17 |
| 4,188,276 | 2/1980 | Lyons et al. | 204/159.15 |
| 4,291,142 | 9/1981 | Tamura et al. | 204/159.15 |

FOREIGN PATENT DOCUMENTS 1184599  3/1970  United Kingdom.

OTHER PUBLICATIONS

Kaji et al. I (Nippon Genshiryoku Kenkyusho Nempo, 1971 JAERI 5027, 26–31).
Kaji et al. II (Nippon Genshiryoku Kenkyusho Nempo, 1973 JAERI 5028, 30–34).
Zimmerman vol. II, pp. 121–134 of "The Radiation Chemistry of Macromolecules" (Academic Press, 1973).

*Primary Examiner*—William R. Dixon, Jr.
*Attorney, Agent, or Firm*—Timothy H. P. Richardson

[57] ABSTRACT

Polyamides comprising substantial amounts of Nylon-11 and/or Nylon-12 units are cross-linked by irradiation in the presence of an unsaturated cross-linking agent, preferably triallyl isocyanurate. The cross-linked products are particularly useful in the form of heat-recoverable shaped articles, e.g. heat-shrinkable tubing.

31 Claims, No Drawings

RADIATION CROSS-LINKING OF POLYAMIDES

CROSS-REFERENCE TO RELATED APPLICATION

This application is a continuation-in-part of our application Ser. No. 212,483, filed Dec. 3, 1980, now abandoned, the disclosure of which is incorporated herein by reference.

BACKGROUND OF THE INVENTION

1. Field of the Invention

This invention relates to radiation cross-linked polyamides and to articles, particularly heat-recoverable articles, made therefrom.

2. Summary of the Prior Art

Polymers differ in their response to ionizing radiation, e.g. high energy electrons. Some are cross-linked, with little degradation, by suitable radiation doses, while others cannot be usefully cross-linked. The balance between cross-linking and degradation can in some cases be improved by mixing the polymer with a suitable unsaturated radiation cross-linking agent (sometimes called a "pro-rad") prior to irradiation. Reference may be made for example to U.S. Pat. Nos. 2,858,259, 3,215,671, 3,681,216, 3,763,222, 3,970,770, 3,985,716, 3,911,192, 3,894,118, 3,840,619, 3,968,015, 3,995,091, 4,073,830, 4,121,001 and 4,188,276, the disclosures of which are incorporated herein by reference Heat-recoverable articles can be made from radiation cross-linked articles, but they are liable to split if the polymer has been significantly degraded by the radiation.

Cross-linking of polyamides by radiation and grafting of monomers onto polyamides using radiation are discussed for example in U.S. Pat. Nos. 2,858,259, 2,965,553, 3,681,216 and 3,711,389 and U.K. Pat. No. 1,184,599. However, the known processes suffer from serious disadvantages, for example failure to produce adequate cross-linking, excessive degradation of the polyamide, and impractical processing techniques.

SUMMARY OF THE INVENTION

We have now discovered that Nylon-11 and Nylon-12, and polyamide copolymers and polymer blends containing substantial proportions of Nylon-11 and Nylon-12, can be cross-linked by means of ionizing radiation in the presence of pro-rads, and that very useful heat-shrinkable articles can be made from the cross-linked products. The cross-linking process can be carried out in air, and excellent results can be obtained using small amounts of cross-linking agent and low radiation dosages. The use of a small amount of pro-rad is desirable not only for economic reasons but also, when the cross-linked material may be contacted by a material, (e.g. a solvent) which will extract the pro-rad, in order to minimize contamination of the extractant. The use of a small radiation dose is desirable not only for economic reasons but also because degradation and consequent embrittlement are minimized.

In one aspect, the present invention provides an article, especially a heat-recoverable article, composed of a radiation cross-linked polymeric composition which has an $M_{100}$ value above its melting point of at least 30 psi and which comprises (a) a cross-linked organic polymer component which comprises at least 80% by weight of at least one polyamide consisting essentially of monomer units which are linked to each other through amide linkages, at least 25% by weight of said monomer units having the formula $-NH-(CH_2)_p-CO-$, where p is 11 or 12; and (b) the residue of an unsaturated radiation cross-linking agent used in the radiation cross-linking of said polymer component.

In another aspect, the invention provides a process for the manufacture of a cross-linked polymeric article as defined above which comprises the steps of (1) melt-shaping a polymeric composition comprising
   (a) an organic polymer component which comprises at least 80% by weight of at least one polyamide consisting essentially of monomer units which are linked to each other through amide linkages, at least 25% by weight of said monomer units having the formula $-NH-(CH_2)_p-CO-$, where p is 11 or 12; and
   (b) an unsaturated radiation cross-linking agent for said polymer; and (2) irradiating the shaped article prepared in step (1) to effect cross-linking thereof.

A preferred embodiment of the process further comprises the steps of (3) heating the cross-linked article above its melting point; (4) deforming the article while it is at a temperature above its melting point; and (5) cooling the article while it is in the deformed condition; whereby a heat-recoverable article is prepared.

DETAILED DESCRIPTION OF THE INVENTION

The organic polymer component used in this invention comprises at least 80%, usually at least 90%, preferably at least 95%, especially substantially 100%, of one or more polyamides in which substantially all the monomer units are linked to each other through amide linkages. (Percentages are by weight throughout this specification.) Thus the component may (but preferably does not) contain a small proportion of one or more other polymers, eg. polyethylene. The polyamide contains at least 25%, preferably at least 75%, based on the component, of Nylon-11 and/or Nylon-12 units, i.e. units of the formula $-NH-(CH_2)_p-CO-$, where p is 11 or 12. These units may be present as a homopolymer, i.e. Nylon-11 (polyundecanoamide) or Nylon-12 (polydodecanoamide), or as part of a copolymer, or both. Thus the polymer component may contain 25 to 100%, preferably 75 to 100%, of Nylon-11 or Nylon-12 or both, and 0 to 75%, preferably 0 to 25% of another polyamide, preferably Nylon-6, Nylon-6,6, Nylon-6,9, Nylon-6,10, or Nylon-6,12 or two or more of these. When the polymer component is a blend of two or more polymers, the polymers should of course be compatible with each other.

The pro-rads for use in this invention usually consist of elements selected from carbon, hydrogen, oxygen and nitrogen. The preferred pro-rad is triallyl isocyanurate, which we have found to give particularly good results even when used in small amounts and at low radiation doses. Triallyl cyanurate is also very useful, especially when used under conditions which cause isomerisation to the isocyanurate. Mixtures of pro-rads can be used. The amount of pro-rad used is preferably less than 4%, eg. 0.1 to 4%, particularly less than 2%, eg. 0.1 to 2%, especially about 1%, eg. 0.3 to 1.25%, based on the polymer component.

The polymeric composition may contain other ingredients in addition to the polymer compound and the pro-rad (or residue thereof after radiation cross-linking). For example the composition may contain organic and/or inorganic flame retardants, fillers, processing aids and antioxidants. The amount of such additives may be for example up to 60% by weight of the composition, eg. 10 to 40%. Care should be taken to avoid the use of excessive amounts of antioxidants and other additives which inhibit cross-linking and make it necessary to use larger amounts of pro-rads and/or higher radiation dosages. It is an additional surprising feature of this invention that even compositions containing relatively large amounts of antioxidant, eg. 1 to 3% of the composition, can be successfully cross-linked.

Compounds which are useful as flame retardants in this invention include both halogen-containing and halogen-free retardant systems. In one embodiment the composition contains 15 to 35%, eg. about 25%, of a halogenated, preferably brominated, organic flame retardant and 5 to 15%, eg. about 10%, of an inorganic synergist therefor, preferably antimony trioxide, and optionally other flame retardants. In another embodiment the composition is substantially free of halogen and contains an effective amount of non-halogenated flame retardants, eg. one or more of (a) a particulate salt in which the anion comprises oxygen and the cation is a metal of Group II A of the Periodic Table, eg. basic magnesium carbonate, talc or clay;

(b) a particulate salt in which the anion comprises boron and oxygen and the cation is a metal of Group II B of the Periodic Table, eg. zinc borate;

(c) a particulate compound of an element of Group IV or V of the periodic Table, eg. antimony trioxide; and (d) a particulate sulfide of a transition metal, eg. zinc sulfide.

We have found that excellent results can be obtained using radiation dosages of at most 12 Mrad, and often less, eg. at most 8 Mrad or at most 6 Mrad. In order to obtain a particular degree of cross-linking, the radiation dose required is dependent on the amount and type of pro-rad present. Especially for articles which are to be rendered heat-recoverable, the pro-rad and radiation dose are preferably selected so that the cross-linked article has an $M_{100}$ value above its melting point, of 30 to 150 psi, preferably 35 to 60 psi or higher, e.g. 50 to 100 psi, and/or an $E_{30}$ value above its melting point, of 80 to 250 psi, e.g. 80 to 140 psi. The $M_{100}$ and $E_{30}$ values referred to herein are measured by a modulus test carried out at an elevated temperature above the melting point of the article, i.e. after melting is completed. In this test, the stress required to elongate a specimen of the cross-linked article by 30 and 100% is measured, using an Instron tester at a crosshead speed of 2 inch-/minute, a jaw separation of 1.9 inch and a chart speed of 5 inch/minute. If the article is heat-recoverable, it is recovered in the absence of any restraint before the test is carried out. A specimen, usually a strip 0.25 or 0.5 inch wide, cut from the cross-linked article is clamped at the top and allowed to equilibrate at the elevated temperature, and the lower end is then clamped. The force required to elongate the specimen to 30% and to 100% is recorded. The $E_{30}$ and $M_{100}$ values are then calculated as follows $$E_{30} = \frac{\text{Force at 30\% elongation}}{\text{Initial cross-sectional area of specimen}} \times \frac{1.30}{0.30}$$

$$M_{100} = \frac{\text{Force at 100\% elongation}}{\text{Initial cross-sectional area of specimen}}$$

Articles prepared by cross-linking according to the invention can readily be converted into heat-recoverable articles by methods well known in the art. Preferred recoverable articles of the invention are hollow and heat-shrinkable, eg. tubing. Such an article may contain or have a coating on at least a part of its inner surface of a material which flows at the recovery temperature of the article, eg. Nylon-12 which is substantially free from cross-linking or has been cross-linked only to a limited extent which does not prevent it from flowing at the recovery temperature.

The invention is illustrated by the following Examples, which are summarised in Table 1, 2, 3 and 4 below, Examples 1, 2 and 16 being comparative Examples outside the scope of the invention.

In each of the Examples, the indicated amounts (in parts by weight) of the indicated ingredients were mixed together in a ZSK extruder, extruded into a water bath and cut into pellets. After drying, the pellets were melt-shaped, in Examples 1 to 23 into slabs 6.0×6.0×0.025 inch, using a heated press at 30,000 psi pressure and a temperature of 200° C., and in Examples 24 to 36 into tubing having an internal diameter of 0.125 inch and a wall thickness of 0.022 inch, using a single screw extruder. The shaped articles were then irradiated to the indicated dose, using a beam of high energy electrons. The indicated properties of the cross-linked product were then measured. The cross-linked tubing produced in Examples 24 to 26 was converted into heat-shrinkable tubing by expanding it to an internal diameter of 0.25 inch in a glycerine bath.

The Nylon-11 used in Examples 1 to 15 and 20-26 was the product sold by Rilsan Corporation under the trade name BESNO, which is believed to be substantially pure polyundecanoamide. The plasticised Nylon-11 used in Examples 27 and 28 was the product sold by Rilsan Corporation under the trade name BESNO-P40 which is a plasticised polyundecanoamide. The stabilized Nylon-11 used in Examples 29 to 36 was the product sold by Rilsan Corporation under the trade name BESNO-TL, which is a light- and heat-stabilized polyundecanoamide. The Nylon-12 used in Examples 16 to 19 was the product sold by Huls under the trade name L-2101, which is believed to be substantially pure polydodecanoamide. The antioxidant used in Examples 37 to 39, Cyanox 1212, is available from American Cyanamid and is believed to be a mixture of distearyl thio-di-propionate and dilauryl thio-di-propionate. The antioxidant used in Example 37, Goodrite 3114, is available from B. F. Goodrich and is tris (3,5-di-t-butyl-4-hydroxybenzyl) isocyanurate. The antioxidant used in Example 38, Goodrite 3125, is available from B. F. Goodrich and is 3,5-di-t-butyl-4-hydroxyhydrocinnamic acid triester with 1,3,5-tris (2 hydroxyethyl)-S-triazine-2,4,6 (1H,3H,5H-trione). The antioxidant used in Example 39, Irganox 1010, is available from Ciba-Geigy and is tetrakis[methylene 3-($3^1,5^1$-di-t-butyl-$4^1$-hydroxyphenyl) propionate]methane.

TABLE 1

| Example No. | 1(c) | 2(2) | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Nylon-11 | 99 | 100 | 99 | 99 | 99 | 99 | 99 | 98 | 98 | 98 | 98 | 96 | 99 | 98 | 96 |
| Triallyl isocyanurate | 1 | — | 1 | 1 | 1 | 1 | 1 | 2 | 2 | 2 | 2 | 4 | — | — | — |
| Triallyl cyanurate | — | — | — | — | — | — | — | — | — | — | — | — | 1 | 2 | 4 |
| Radiation Dose (Mrad) | 0 | 10 | 0.5 | 1 | 2 | 4 | 10 | 0.5 | 1 | 2 | 10 | 10 | 10 | 10 | 10 |
| $M_{100}$ at 200° C. (psi) | melted | melted | 72 | 130 | 153 | 148 | 157 | 78 | 117 | 137 | 155 | 362 | 46 | 140 | 140 |

TABLE 2

| Example No. | 16(c) | 17 | 18 | 19 |
|---|---|---|---|---|
| Nylon-12 | 100 | 99 | 98 | 96 |
| Triallyl isocyanurate | 0 | 1 | 2 | 4 |
| Radiation Dose (Mrad) | 10 | 10 | 10 | 10 |
| $M_{100}$ at 200° C. (psi) | melted | 130 | 213 | 405 |

TABLE 3

| Example No. | 20 | 21 | 22 | 23 |
|---|---|---|---|---|
| Nylon-11 | 80 | 82 | 82 | 82 |
| Antimony trioxide | 5 | 5 | 5 | 5 |
| Magnesium Carbonate | 7 | — | — | — |
| Zinc Borate | 5 | — | — | — |
| Bromine-containing organic flame retardant | — | 10 | 10 | 10 |
| Triallyl isocyanurate | 3 | 3 | 3 | 3 |
| Radiation Dose (Mrad) | 10 | 10 | 10 | 10 |
| $M_{100}$ at 200° C. (psi) | 193 | 167 | 168 | 163 |
| Oxygen Index | 23 | 24.5 | 22 | 25 |

TABLE 4

| Example No. | 24 | 25 | 26 | 27 | 28 | 29 | 30 | 31 | 32 | 33 | 34 | 35 | 36 |
|---|---|---|---|---|---|---|---|---|---|---|---|---|---|
| Nylon-11 | 97 | 97 | 97 | — | — | — | — | — | — | — | — | — | — |
| Plasticised Nylon-11 | — | — | — | 98 | 98 | — | — | — | — | — | — | — | — |
| Stabilised Nylon-11 | — | — | — | — | — | 97 | 97 | 97 | 97 | 98 | 98 | 98 | 99 |
| Triallyl isocyanurate | 3+ | 3+ | 3+ | 2 | 2 | 3+ | 3+ | 3+ | 3+ | 2 | 2 | 2 | 1 |
| Radiation Dose (Mrad) | 6 | 1.8 | 0.64 | 3.5 | 10.8 | 8 | 3.2 | 2.0 | 1.8 | 2.3 | 1.6 | 3.5 | 6.7 |
| $E_{30}$ at 200° C. (psi) | 456 | 372 | 225 | 78 | 75 | 297 | 206 | 145 | 142 | 170 | 130 | 205 | 108 |
| $M_{100}$ at 200° C. (psi) | — | 188 | 122 | 48 | 34 | 146 | 109 | 75 | 76 | — | — | — | 45 |

TABLE 5

| Example No. | 37 | 38 | 39 |
|---|---|---|---|
| Stabilized Nylon-11 | 95.5 | 95.5 | 95.5 |
| Triallyl isocyanurate | 3 | 3 | 3 |
| Antioxidant | | | |
| Cyanox 1212 | 0.5 | 0.5 | 0.5 |
| Goodrite 3114 | 1 | — | — |
| Goodrite 3125 | — | 1 | — |
| Irganox 1010 | — | — | 1 |
| Radiation Dose (Mrad) | 18 | 18 | 18 |
| $M_{100}$ at 200° C. (psi) | 101 | 278 | 121 |

We claim:

1. A heat-recoverable article composed of a radiation cross-linked polymeric composition which has an $M_{100}$ value above its melting point of at least 30 psi and which comprises
   (a) a cross-linked organic polymer component which comprises at least 80% by weight of at least one polyamide consisting essentially of monomer units which are linked to each other through amide linkages, at least 25% by weight of said monomer units having the formula $-NH-(CH_2)_p-CO-$ where p is 11 or 12; and
   (b) the residue of an unsaturated radiation cross-linking agent used in the radiation cross-linking of said polymer component.

2. An article according to claim 1 wherein said organic polymer component consists essentially of at least one said polyamide.

3. An article according to claim 1 wherein at least 75% by weight of said monomer units have the formula $-NH-(CH_2)_p-CO-$ where p is 11 or 12.

4. An article according to claim 1 wherein said polymer component consists essentially of
   (a) 25 to 100% by weight of a polymer selected from Nylon-11, Nylon-12, and blends of Nylon-11 and Nylon-12; and
   (b) 0 to 75% by weight of a polymer selected from Nylon-6, Nylon-6,6, Nylon 6,9, Nylon 6,10, and Nylon 6,12 and blends of two or more of these.

5. An article according to claim 4 wherein said organic polymer component consists essentially of 75 to 100% by weight of (a) and 0 to 25% by weight of (b).

6. An article according to claim 5 wherein said organic polymer component consists essentially of a polymer selected from Nylon-11, Nylon-12, and blends of Nylon-11 and Nylon-12.

7. An article according to claim 1 which is substantially uniformly cross-linked through the thickness thereof.

8. An article according to claim 1 wherein said cross-linking agent is selected from the group consisting of triallyl isocyanurate and triallyl cyanurate and mixtures thereof.

9. An article according to claim 5 which has an $M_{100}$ value above its melting point of 35 to 60 psi.

10. An article according to claim 5 which has an $E_{30}$ value above its melting point of 80 to 140 psi.

11. An article according to claim 10 which contains less than 2% by weight of residues of said cross-linking agent, based on the weight of the organic polymer component.

12. An article according to claim 1 which is hollow and heat-shrinkable and which has an inner surface which has a coating on at least a part thereof of a material which flows at the recovery temperature of the article.

13. An article according to claim 1 wherein said composition further comprises 15 to 35% by weight of a halogenated organic flame retardant and 5 to 15% by weight of an inorganic synergist therefor.

14. A heat-shrinkable tube composed of a radiation cross-linked polymeric composition which comprises (a) an organic polymer component which consists essentially of cross-linked Nylon-11 and (b) the residue of an unsaturated radiation cross-linking agent, said tube having an $M_{100}$ value at 200° C. of 35 to 60 psi.

15. A tube according to claim 14 which has on its inner surface a coating of a material which flows at the recovery temperature of the article.

16. A tube according to claim 14 wherein said coating is composed of Nylon-12.

17. An article according to claim 14 which is substantially uniformly cross-linked through the thickness thereof.

18. A process for the manufacture of a cross-linked polymeric article which comprises the steps of
  (1) melt-shaping a polymeric composition comprising
    (a) an organic polymer component which comprises at least 90% by weight of at least one polyamide consisting essentially of monomer units which are linked to each other through amide linkages, at least 25% by weight of said monomer units having the formula $-NH-(CH_2)_p-CO-$ where p is 11 or 12; and
    (b) an unsaturated radiation cross-linking agent for said polymer; and
  (2) irradiating the shaped article prepared in step (1) to effect cross-linking thereof to a level such that the article has an $M_{100}$ value above its melting point of at least 30 psi.

19. A process according to claim 18 wherein said organic polymer component consists essentially of at least one said polyamide.

20. A process according to claim 18 wherein at least 75% by weight of said monomer units have the formula $-NH-(CH_2)_p-CO-$ where p is 11 or 12.

21. A process according to claim 18 wherein said polymer component consists essentially of
  (a) 25 to 100% by weight of a polymer selected from Nylon-11, Nylon-12, and blends of Nylon-11 and Nylon-12; and
  (b) 0 to 75% by weight of a polymer selected from Nylon-6, Nylon-6,6, Nylon 6,9, Nylon 6,10, and Nylon 6,12 and blends of two or more of these.

22. A process according to claim 21 wherein said organic polymer component consists essentially of 75 to 100% by weight of (a) and 0 to 25% by weight of (b).

23. A process according to claim 22 wherein said organic polymer component consists essentially of a polymer selected from Nylon-11, Nylon-12, and blends of Nylon-11 and Nylon-12.

24. A process according to claim 18 wherein said cross linking agent is selected from the group consisting of triallyl isocyanurate and triallyl cyanurate and mixtures thereof.

25. A process according to claim 18 wherein the amount of said cross-linking agent is less than 4% by weight, based on the weight of the organic polymer component, and the shaped article is irradiated to a dose of at most 12 Mrad.

26. A process according to claim 25 wherein the shaped article is irradiated in air to a dose of at most 8 Mrad.

27. A process according to claim 25 wherein the cross-linked article has an $M_{100}$ value above its melting point of 30 to 150 psi.

28. A process according to claim 18 wherein said composition further comprises 15 to 35% by weight of a halogenated organic flame retardant and 5 to 15% by weight of an inorganic synergist therefor.

29. A process according to claim 18 wherein the amount of said cross-linking agent is less than 2% by weight, based on the weight of the organic polymer component, and the shaped article is irradiated in air to a dose such that the cross-linked article has an $M_{100}$ value above its melting point of 35 to 60 psi.

30. A process according to claim 29 wherein said cross-linking agent is triallyl isocyanurate.

31. A process according to claim 18 which further comprises the steps of
  (3) heating the cross-linked article above its melting point;
  (4) deforming the article while it is at a temperature above its melting point; and
  (5) cooling the article while it is in the deformed condition;
whereby a heat-recoverable article is prepared.

* * * * *